3,318,862
PROCESS FOR REDUCING COLD FLOW IN 1,3-BUTADIENE POLYMERS

Robert A. Hinton, Bartlesville, Okla., assignor to Phillips Petroleum Company, a corporation of Delaware
No Drawing. Filed June 10, 1963, Ser. No. 286,486
6 Claims. (Cl. 260—94.2)

This invention relates to an improved method for making 1,3-butadiene polymers. In another aspect it relates to a 1,3-butadiene polymer prepared in the presence of an organolithium initiator and having reduced tendency to cold flow.

Many polymers of 1,3-butadiene prepared in the presence of an organolithium initiator have a strong tendency to flow in the uncured state. This tendency to cold flow becomes particularly noticeable if the Mooney value of the polymer is below 30 (ML-4 at 212° F.).

Cold flow occurs in these polymers only while they are in the uncured state. It is possible, therefore, to cross link the molecules of the polymers such as is done by conventional curing in order to reduce cold flow. This approach is undesirable where polymers must be later compounded in masticating equipment. It is highly desirable, therefore, to find a method of reducing the tendency of these polymers to cold flow by a method other than conventional curing.

I have now found that 1,3-butadiene polymers prepared in the presence of an organolithium initiator can be treated in the polymerization mixture in such a way that cold flow of the recovered polymer is substantially reduced. According to my invention this improvement is realized by adding to the polymerization mixture a small amount of an aromatic compound containing a plurality of halogen (chlorine or bromine) atoms.

The following are objects of my invention.

An object of the invention is to provide an improved method of polymerizing 1,3-butadiene. Another object is to provide a method whereby 1,3-butadiene can be polymerized in the presence of an organolithium initiator to provide a product with a reduced tendency to cold flow. Still another object is to provide an improved 1,3-butadiene polymer which has been prepared in the presence of an organolithium initiator which has little tendency to flow in the uncured state. Other objects and advantages of my invention will be apparent to those skilled in the art from the accompanying disclosure.

The polymers which can be prepared according to my invention are broadly the polymers of 1,3-butadiene. 1,3-butadiene polymers can also be formed by polymerizing the 1,3-butadiene with one or more copolymerizable mono-vinylidene-containing monomers such as styrene, 2-methyl-styrene, vinylnaphthalene or the like, with the 1,3-butadiene being present in major amount, to form random or block copolymers.

The organolithium initiators can be represented by the formula $RLi_x$ where R is a hydrocarbon radical selected from the group consisting of aliphatic, cycloaliphatic and aromatic radicals containing from 1 to 20 carbon atoms and $x$ is an integer of 1 to 4. Examples of such initiators include methyllithium, n-butyllithium, phenyllithium, cyclohexyllithium, 1,4-dilithiobutane, 1,4-dilithio-2-methyl-2-butene, dilithionapthalene, 1,2-dilithio-1,2-diphenylethane, tetralithionaphthalene, and the like. The organo monolithium compounds are preferred. Polymerizations of this type are well known and are normally carried out in the presence of a diluent which is predominantly hydrocarbon, such as benzene, toluene, n-hexane, isooctane or the like. The amount of initiator used depends upon the desired molecular weight of the polymer but is normally in the range of about 0.25 to 100 millimoles per 100 grams of monomer.

The cold flow of the final product is substantially reduced by incorporating into the polymerization mixture a small amount of an aromatic compound containing at least two substituents selected from the group consisting of chlorine and bromine. The amount of halogen substituted aromatic compound can be varied but is generally in the range of 1 to 4 moles per mole of oraganolithium compound used. Two or more of the chlorine or bromine atoms can be present. The aromatic compound to which the halogen atoms are attached include benzene, naphthalene, phenanthrene, anthracene, diphenyl, etc. The degree of halogen substitution can range from two atoms to the fully substituted material. Inert substituents can also be attached to the aromatic structure and mixtures of the aromatic compounds can be used.

Examples of suitable halogenated aromatic compounds which can be used include 1,2-dichlorobenzene,
1,3-dichlorobenzene,
1,4-dichlorobenzene,
1,2-dibromobenzene,
1,3-dibromobenzene,
1,4-dibromobenzene,
1-chloro-4-bromobenzene,
1,2,4-trichlorobenzene,
1,3,5-trichlorobenzene,
1,3,5-tribromobenzene,
1,2,3,5-tetrachlorobenzene,
1,2,4,5-tetrabromobenzene,
hexachlorobenzene,
hexabromobenzene,
1,2-dichloronaphthalene,
1,4-dichloronapthalene,
1,6-dibromonaphthalene,
1,8-dichloronaphthalene,
2,6-dichloronaphthalene,
2,7-dichloronaphthalene,
1,2,3,4-tetrachloronaphthalene,
1,2,7,8-tetrachloronaphthalene,
3,9-dibromophenanthrene,
9,10-dibromophenanthrene,
3,9-dichlorophenanthrene,
1,2,3,4-tetrachlorophenanthrene,
1,3,5,6-tetrabromophenanthrene,
1,2,7,8-tetrachlorophenanthrene,
2,6-dichloroanthracene,
9,10-dichloroanthracene,
1,4-dichloroanthracene,
1,2,3,4,5,6-hexachloroanthracene,
1,4,5,8-tetrachloroanthracene,
1,5,9,10-tetrachloroanthracene,
1,8,9,10-tetrabromoanthracene,
1,5,9-trichloroanthracene,
2,9,10-tribromoanthracene,
2-bromo-2'-chlorodiphenyl,
4-bromo-4'-chlorodiphenyl,
4,4'-dibromodiphenyl,
3,3'-dichlorodiphenyl,
2,5-dichlorodiphenyl,
3,4-dichlorodiphenyl,
2,3,4,4',5-pentachlorodiphenyl,
2,2',4,4'-tetrabromodiphenyl,
3,3',4,4'-tetrachlorodiphenyl,
2,4,6-trichlorodiphenyl, and
2,4,4'-trichlorodiphenyl.

A broad range for the polymerization is from 0 to 300° F. with 15 to 175° F. being a preferred range.

The following examples further illustrate my invention and show the advantages obtained by its use. The specific details are illustrative and should not be considered unduly limiting.

Example I

Butadiene was polymerized in a reactor system comprising a premixer, two 4.5 gallon reactors in series followed by a 24.7 gallon operating with a residence time of 13.5 minutes in each of the 4.5 gallon reactors and 73 minutes in the 24.7 gallon reactor.

The following recipe was used:

| | Parts by weight |
|---|---|
| n-Hexane | 1000 |
| 1,3-butadiene | 100 |
| n-Butyllithium | 0.150 |
| 1,4-dichlorobenzene | 0.517 |

This provided a mol ratio of 1,4-dichlorobenzene to n-butyllithium of 1.5 to 1. The solvent was preheated to 210° F. and the two 4.5 gallon reactors operated adiabatically between 220° F. and 240° F. while the 24.7 gallon reactor was controlled at 250° F. by circulating steam through the jacket thereof. Conversion of 90 percent was obtained in 27 minutes (the output of the second 4.5 gallon reactor) producing a rubber with a Mooney viscosity (ML-4 at 212° F.) of 12 and a cold flow of 4.0 mg./min. The 73 minute soak in the 24.7 gallon reactor did not result in further monomer conversion but increased the Moonel viscosity (ML-4 at 212° F.) to 20 and reduced cold flow to zero. The reaction was short-stopped by adding stearic acid at a 1.0 phr. level and stabilized by adding 0.5 phr. 2,6-di-tert-butyl-4-methylphenol. The polymer was completely soluble in toluene, this indicating the absence of gel.

Example II

The procedure of Example I was repeated to except the amount of dichlorobenzene was increased to provide a 3 to 1 mol ratio of dichlorobenzene to n-butyllithium. Conversion remained the same and the rubber produced had substantially the same properties.

Example III

The polymer of Example I was evaluated to determine the processing and physical properties. To provide a standard, it was compared with another n-butyllithium polymer prepared by a batch process in a 1000 gallon reactor using the following recipe:

| | Parts by weight |
|---|---|
| 1,3-butadiene | 100 |
| n-Hexane | 828 |
| n-Butyllithium | 0.15 |

Polymerization was initiated at 144° F. No cooling was used during polymerization and a peak temperature was reached in 13 minutes at which time the conversion was essentially quantitative (100 percent conversion). The batch was cooled to 100° F., 1.0 phr. stearic acid added to destroy the catalyst, and 0.75 phr. 4,4'-thio-bis(6-tert-butyl-meta-cresol) as a stabilizer. The recovered rubber had a Mooney viscosity (ML-4 at 212° F.) of 37 and a cold flow of approximately 6.5 mg./min.

The following compounding recipe was used:

| | Parts by weight |
|---|---|
| Polymer | 100 |
| HAF black | 50 |
| Zinc oxide | 3 |
| Stearic acid | 1 |
| Flexamine [1] | 1 |
| Resin 731D [2] | 5 |
| Philrich 5 oil [3] | 5 |
| Sulfur | 1.75 |
| NOBS special [4] | 1.2 |

[1] Physical mixture containing 65 percent of a diarylamine-ketone reaction product and 35 percent of N,N'-diphenyl-p-phenylene diamine.
[2] Disproportionated rosin.
[3] Highly aromatic rubber processing oil.
[4] N-oxydiethylene-2-benzothiazolesulfenamide.

The products, cured 30 minutes at 307° F., showed the following physical properties:

| | Using Dichlorobenzene | Control |
|---|---|---|
| Compression Set, percent | 30.0 | 21.6 |
| 300% Modulus, p.s.i | 915 | 1,195 |
| Tensile, p.s.i | 2,230 | 2,680 |
| Elongation, percent | 525 | 500 |
| Tear @ 200° F., lb./in | 190 | 150 |
| Shore A Hardness | 59.5 | 65.5 |

This table shows that a product having a good balance of physical properties is obtained using my invention.

Cold-flow was determined by extruding the rubber through a ¼-inch orifice having a length of 0.107 inch at 3.5 p.s.i. pressure at a temperature of 122° F. After allowing 10 minutes to reach steady state, the rate of extrusion is measured and the value reported in milligrams per minute.

As many possible embodiments can be made of this invention without departing from the scope thereof, it is to be understood that all matter herein set forth is to be interpreted as illustrative and not as unduly limiting the invention.

I claim:

1. In the polymerization of 1,3-butadiene in the presence of an organolithium initiator, the method of reducing the tendency of the polymer to cold flow which comprises adding to the polymerization mixture from 1.5 to 4 moles of an aromatic compound containing at least two substituents selected from the group consisting of chlorine and bromine per mole of organolithium initiator.

2. The process of claim 1 wherein said organolithium compound has the formula $R(Li)_x$ wherein R is a hydrocarbon radical selected from the group consisting of aliphatic, cycloaliphatic, and aromatic radicals and $x$ is an integer from 1 to 4.

3. The process of claim 1 wherein said organolithium compound is n-butyllithium.

4. In the polymerization of 1,3-butadiene in the presence of an organolithium initiator, the method of reducing the tendency of the polymer to cold flow which comprises adding to the polymerization mixture from 1.5 to 4 moles of para-dichlorobenzene per mole of organolithium compound presents in the system.

5. The process of claim 4 wherein said organolithium compound is n-butyllithium.

6. The process of claim 4 wherein the polymer so produced is heated to about 250° F. for about one hour.

References Cited by the Examiner

UNITED STATES PATENTS 3,215,679   11/1965   Trepka _____ 260—94.2

JOSEPH L. SCHOFER, *Primary Examiner.*

H. I. CANTOR, *Assistant Examiner.*